United States Patent [19]
Gordon et al.

[11] 3,853,475
[45] Dec. 10, 1974

[54] ELECTRICAL-EQUIPMENT CASINGS WITH CLAMP-ON DESALINATION UNIT

[75] Inventors: Alfred Kenneth Gordon, Churchdown; Kenneth Eardley Willmott, Cheltenham, both of England

[73] Assignee: Smiths Industries Limited, London, England

[22] Filed: May 22, 1972

[21] Appl. No.: 255,329

[30] Foreign Application Priority Data
May 26, 1971 Great Britain.................. 17249/71

[52] U.S. Cl.............. 23/252 R, 23/284, 98/52, 98/53, 55/387, 55/388, 55/389, 21/53, 174/16 R, 174/14 R, 34/80, 210/38, 317/234 R
[51] Int. Cl.............................................. B01j 1/08
[58] Field of Search............ 23/284, 252 R; 55/387, 55/388, 389, 274; 98/52, 53; 21/53; 174/14 R–16 R; 34/80; 210/38; 317/234 R; 220/46 PV; 252/194; 423/240

[56] References Cited
UNITED STATES PATENTS

| | | | |
|---|---|---|---|
| 1,476,138 | 12/1923 | Bingay | 55/387 UX |
| 2,230,427 | 2/1941 | Frank | 55/490 UX |
| 2,364,144 | 12/1944 | Hunsaker | 98/32 |
| 3,482,701 | 12/1969 | Zaromb | 210/38 X |
| 3,559,382 | 2/1971 | Jaggard et al. | 55/387 X |

*Primary Examiner*—James H. Tayman, Jr.
*Attorney, Agent, or Firm*—Pollock, Philpitt & Vande Sande

[57] ABSTRACT

An ATR case containing electrical equipment has a flat rectangular ventilator unit clamped and bonded in face-to-face relationship to the underside of the casing for communicating air to the casing-interior from a duct open to the ambient atmosphere at one end of the unit. The communicated air is ducted through a mixed-bed filter in the ventilator unit that converts any air-borne salt to water. This water and any air-borne moisture is removed by desiccant material before the salt-filtered air is ducted through outlet vents in the upper wall of the ventilator unit, into the casing interior. The desiccant is contained within a cavity that opens into the outlet ducting but is located beyond the vents for the desalinating filter.

3 Claims, 4 Drawing Figures

PATENTED DEC 10 1974 3,853,475

ELECTRICAL-EQUIPMENT CASINGS WITH CLAMP-ON DESALINATION UNIT

This invention relates to cases for containing electrical equipment.

According to the present invention a case for containing electrical equipment, comprises a casing that provides an enclosure for the electrical equipment, and ventilation means coupled to the casing for communicating air to the enclosure from the ambient atmosphere, and wherein the said ventilation means includes a filter for removing salt from the communicated air.

One application of the case according to the present invention is in aircraft, where air used to effect cooling or otherwise ventilated to the enclosure containing the electrical equipment, is obtained from the atmosphere external to the aircraft.

Such air frequently contains salt, normally common salt and other mineral salts, and this is especially so where the aircraft is operating over the sea. Air-borne salt has a corrosive effect and its action on the electrical equipment within the case would untimately lead to faulty operation. The only way to overcome this difficulty completely would be to seal the casing hermetically, but this involves certain practical disadvantages and increases costs. The present invention provides a way of overcoming the difficulty without the disadvantages and cost of hermetic sealing.

The ventilation means of the case according to the present invention may include a desiccant for removing moisture from the air communicated from the filter.

A case which is for containing electrical equipment and which is for use in an aircraft, will now be described, by way of example, with reference to the accompanying drawings in which FIG. 1 is a side elevation of the case;

Figure 1:
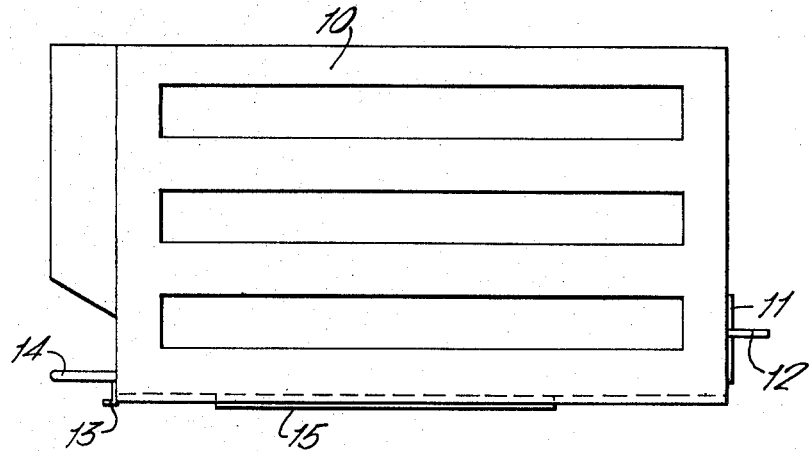

Referring to FIG. 1, the case includes a casing 10 which provides an enclosure for electrical equipment, and which conforms to an ATR (signifying 'Air Transport Radio') standard. The standard specifies rectangular casings of a maximum height of 7.625 inches and of a length which for 'Long' casings is 19.5625 inches and for 'Short' casings is 12.5625 inches. Various widths of casings are specified, these being normally expressed as fractions or multiples of a unit ATR-width of 10.125 inches, and typically the width of a ½ATR casing is 4.875 inches and that of a ¼ATR casing is just less than 2.5 inches. In the present instance, the casing 10 is a 'Short ½ATR' casing.

The casing 10 is for mounting in an elongated guideway of a support framework (not shown), and at its rear carries an electrical connector 11 for mating with an electrical connector on the support framework. The connector 11 is connected with the electrical equipment within the casing 10 and serves in this way for the establishment of external electrical connection to the equipment. Guidance to ensure correct mating with the connector on the support is provided by spigots 12 that project rearwardly, and the case is secured in the guideway by locking nuts (not shown) that are carried by the framework and engage with lugs 13 at the front of the casing 10. A handle 14 is provided at the front of the casing 10 to facilitate withdrawal of the case from the guideway.

The enclosure of the casing 10 containing the electrical equipment, is ventilated to the ambient atmosphere by a unit 15. The ventilator unit 15, which is mounted with its upper wall in face-to-face relationship with the bottom wall of the casing 10, communicates air to the enclosure and in doing so removes from it any airborne salt and moisture that would otherwise cause corrosion and faulty operation of the electrical equipment. Although the casing 10 is not specially sealed, the unit 15 provides the path of lowest impedance such that virtually all air passing into, and leaving, the casing passes through it. The construction of the unit 15 is shown in detail in FIGS. 2 to 4.

Figure 4:
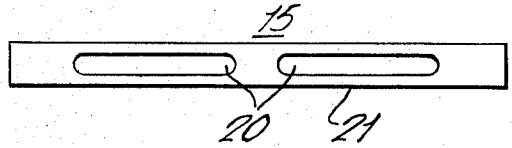
FIG. 4 is an end elevation of the ventilator unit taken in the direction of the arrow IV of FIG. 2.
Figure 2:
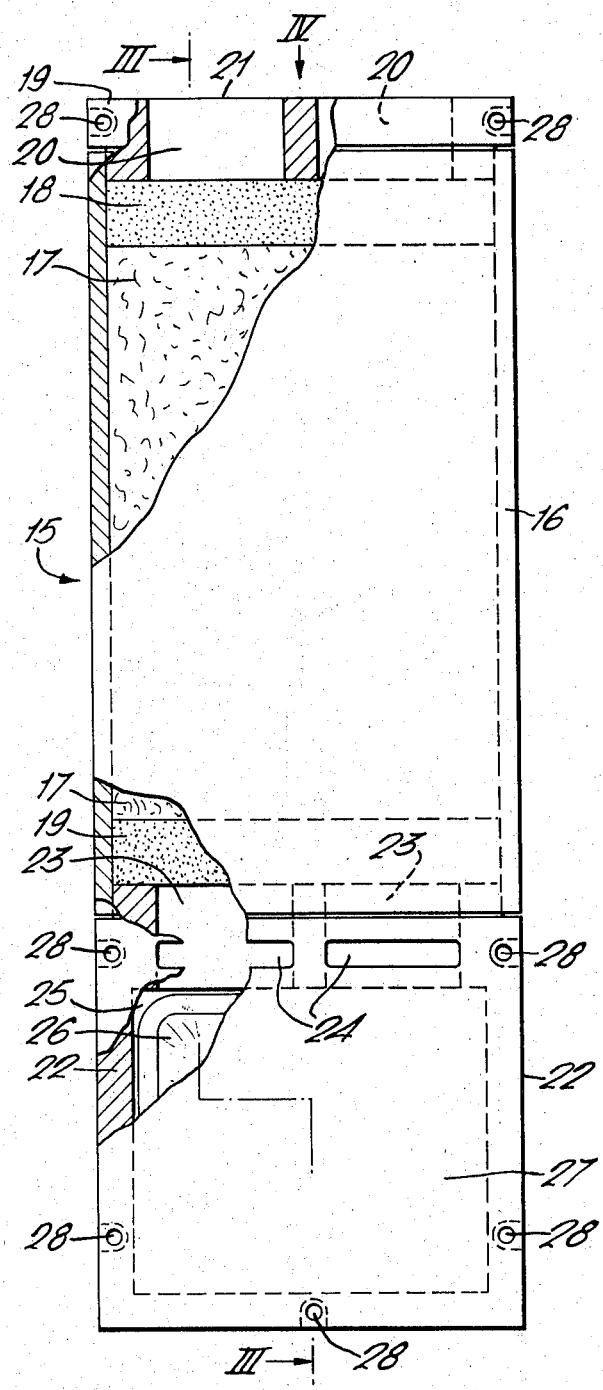
FIG. 2 is a plan view, partially in section, of a ventilator unit that forms part of the case.
Figure 3:
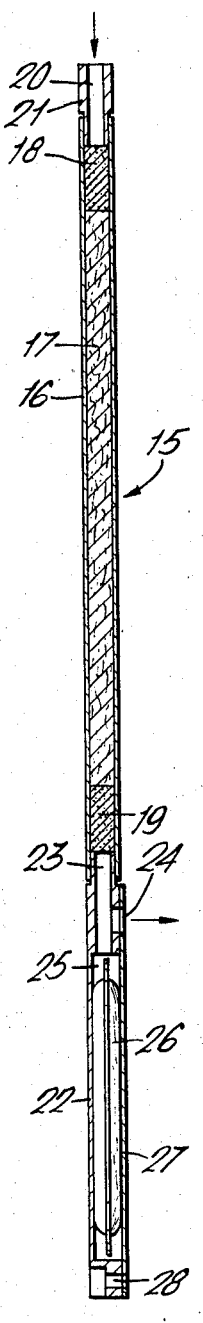
FIG. 3 is a sectional side elevation of the ventilator unit taken on the line III-III of FIG. 2.

Referring to FIGS. 2 to 4, the ventilator unit 15 has a metal housing 16 that contains a filter 17 retained between air-permeable plugs 18 and 19 of polyurethane foam. Air is admitted through the plug 18 to the filter 17 via two ducts 20 in a support block 21 that is sealed into the housing 16 at the front end of the unit 15. A support block 22 that is sealed into the other, rear end of the housing 16 has two corresponding ducts 23 for conveying air that passes from the filter 17 via the plug 19, to two outlet apertures 24 located intermediate the length of the upper wall of the unit 15. The ducts 23 also lead into a cavity-recess 25 of the block 22 which contains an air-permeable bag 26 of a desiccant material and which is closed by a gasket 27. The desiccant material in the bag 26 is effective to remove moisture from the air communicated through the apertures 24 from the ducts 23.

The unit 15 is clamped to the underside of the casing 10 (FIG. 1) by screws that pass through holes 28 in the support blocks 21 and 22, with the apertures 24 in register with similar apertures through the wall of the casing 10. The support block 22 and the gasket 27 are also bonded to the underside of the casing 10 using an epoxy resin (for example that sold under the trade name 'Araldite'). This ensures firmness and an air-tight seal around the apertures 24 where communication is made with the casing interior, so that air flow into, and out of, the case for normal air-pressure equalization with the ambient atmosphere, is made via the salt-removing filter 17.

The filter 17 is formed by a body of loosely-packed particles of a mixed-bed resin material that functions to convert air-borne mineral salts into water. The conversion is a two-part process, in which the anions of the mineral salts are exchanged for hydroxyl ions, and the cations are exchanged for hydrogen ions. The resultant water, together with any other water in the air, is removed by the desiccant material contained by the bag 26 in the cavity-recess 25.

The resin material used to provide the filter 17 in the present example is a mixture of sulphonated and aminated cross-linked polystyrenes such as sold as 'Bio-Deminrolit Mixed-Bed Resin', and preferably has a particle size according to British Standard Mesh of between 14 and 52 units. The particles of this resin material are immersed in a mixture of water and glycerol, and the excess liquid is then allowed to drain off, before they are packed loosely into the housing 16; this reduces subsequent drying-out of the filter 17.

The case described above is of especial advantage for use in aircraft in that it provides an enclosure for electrical equipment that will breath safely and without the danger of consequent corrosion and faulty operation, as the aircraft ascends and descends. In this latter respect therefore, the case has the significant advantages of hermetic sealing without the disadvantages and costly manufacturing costs involved. Although of especial advantage in the context of aircraft, the case is appliable for use in other craft and, notably, sea-craft.

We claim:

1. A case comprising a casing providing an elongate enclosure for containing electrical equipment, said casing being of rectangular cross-section to have four elongate external side-walls, one of said side-walls being apertured to facilitate air flow into the casing, an elongate ventilator unit for communicating air to the enclosure from the ambient atmosphere, said ventilator unit being of rectangular cross section to have four elongate external side-walls, and means clamping the ventilator unit and casing to one another with one of said side-walls of the ventilator unit in face-to-face relationship with said apertured side-wall of the casing, the said ventilator unit comprising inlet-duct means for ducting air from said ambient atmosphere, a body of desalinating material for receiving air from the inlet-duct means to remove salt therefrom, means retaining said body in said inlet-duct means, outlet-duct means for communicating desalinated air from the said body into the casing, said outlet-duct means including an aperture through said one side-wall of the ventilator unit to provide communication of air into said casing through the said apertured side-wall of the casing, and means coupled to said outlet-duct means for removing water from said air communicated into the casing, said means coupled to said outlet-duct means comprising means defining a cavity opening into said outlet-duct means, said cavity being spaced from said body of desalinating material, and a body of desiccant material retained in said cavity for absorbing moisture from the desalinated air.

2. A case according to claim 1, wherein said desalinating material is a mixture of sulphonated and aminated cross-linked polystyrenes.

3. A case comprising a casing providing an elongate enclosure for containing electrical equipment, said casing being of rectangular cross-section to have four elongate external side-walls, one of said side-walls being apertured to facilitate airflow into the casing, an elongate ventilator unit for communicating air to the enclosure from the ambient atmosphere, said ventilator unit being of rectangular cross-section to have four elongate external side-walls, and means clamping the ventilator unit and casing to one another with one of said side-walls of the ventilator unit in face-to-face relationship with said apertured side-wall of the casing, the said ventilator unit comprising inlet-duct means opening through a first of the two ends of said ventilator unit for ducting air from said ambient atmosphere at said first end, a body of desalinating material retained in said inlet-duct means to receive said ducted air for removing salt therefrom, outlet-duct means for communicating desalinated air from the said body into the casing, said outlet-duct means including an aperture through said one side-wall at a location intermediate said two ends of the ventilator unit to provide communication of air into said casing through the said apertured side-wall of the casing, further means defining a cavity opening into said outlet-duct means and located beyond said aperture from said body of desalinating material, and a body of desiccant material retained in said cavity for absorbing moisture from the said desalinated air.

* * * * *